(12) United States Patent
Drewry et al.

(10) Patent No.: US 8,832,455 B1
(45) Date of Patent: Sep. 9, 2014

(54) VERIFIED BOOT PATH RETRY

(75) Inventors: William A. Drewry, Nashville, TN (US); William F. Richardson, Santa Clara, CA (US); Randall R. Spangler, San Jose, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/239,303

(22) Filed: Sep. 21, 2011

(51) Int. Cl.
*G06F 21/00* (2013.01)

(52) U.S. Cl.
USPC .......................................... 713/187; 713/189

(58) Field of Classification Search
None
See application file for complete search history.

(56) References Cited

U.S. PATENT DOCUMENTS

| | | | |
|---|---|---|---|
| 5,892,900 | A | 4/1999 | Ginter et al. |
| 6,463,535 | B1* | 10/2002 | Drews ........................... 713/176 |
| 2003/0005277 | A1* | 1/2003 | Harding et al. .................. 713/2 |
| 2006/0015938 | A1* | 1/2006 | Wlodarczyk .................... 726/22 |
| 2008/0126779 | A1* | 5/2008 | Smith ............................... 713/2 |
| 2010/0076934 | A1* | 3/2010 | Pershin et al. ................. 707/640 |
| 2011/0225429 | A1* | 9/2011 | Papamanthou et al. ....... 713/189 |
| 2012/0102367 | A1* | 4/2012 | Dang et al. ................... 714/47.3 |

OTHER PUBLICATIONS

"Issue 15269: dm-verity: expand failover support", Chromium-OS—the open source project behind Google Chrome OS, retrieved from <http://code.google.com/p/chromium-os/issues/detail?id=15269>, Aug. 23, 2010.
"Issue 8442: dm-verity: update gpt or somehow invalidate booted path on dm-verity failure", Chromium-OS—the open source project behind Google Chrome OS, retieved from <http://code.google.com/p/chromium-os/issues/detail?id=8442>, Oct. 30, 2010.
"Issue 5082: Add reboot-to-recovery support to dm-verity", Chromium-OS—the open source project behind Google Chrome OS, retieved from <http://code.google.com/p/chromium-os/issues/detail?id=5082>, Jul. 23, 2010.
"Verified Boot", The Chromium Projects, retrieved from <http://www.chromium.org/chromium-os/chromiumos-design-docs/verified-boot>, May 23, 2011.
"[chromiumos/third_party/kernel.git] / Documentation / device-mapper / dm-verity.txt", retrieved from <http:// git.chromium.org/gitweb/?p= chromiumos/ third_party/kernel.git;a=blob;f=Documentation/ device- mapper/dm-verity.txt>, May 23, 2011.
"[chromiumos/third_party/ kernel.git] / Documentation / device-mapper / dm-bht.txt", retrieved from <http://git.chromium.org/gitweb/?p=chromiumos/third_party/kernel.git;a=blob;f=Documentation/device-mapper/dm-bht.txt>, May 23, 2011.

* cited by examiner

*Primary Examiner* — Gilberto Barron, Jr.
*Assistant Examiner* — Simon Kanaan
(74) *Attorney, Agent, or Firm* — McDermott Will & Emery LLP

(57) ABSTRACT

Configurations providing a non-zero threshold for verifying a root file system of an operating system stored on blocks of a boot storage are disclosed. In particular, the root file system is verified during a boot sequence for the operating system. For each block of the root file system of the boot storage, the subject technology verifies a respective block of the boot storage. A counter tracking a number of verification failures is incremented if the block fails verification. In some configurations, the subject technology determines whether the counter meets a predetermined non-zero threshold. If the counter meets the predetermined non-zero threshold, the root file system is marked as corrupted. A recovery mode for the operating system is then initiated. If the counter does not meet the predetermined non-zero threshold, the operating system is reset in order to verify the root file system during a subsequent boot sequence.

21 Claims, 5 Drawing Sheets

VERIFIED BOOT PATH RETRY

BACKGROUND

In computing, booting is a process that starts an operating system when the user turns on a computer system. A boot sequence can be understood as an initial set of operations that the system performs when power is switched on for the system.

SUMMARY

The subject technology provides for verifying a root file system of an operating system stored on blocks of a boot storage. For each block of the blocks of the boot storage, the subject technology determines a hash value for the block of the boot storage. The block of the boot storage is verified by comparing the determined hash value with an expected hash value of the block. If the determined hash value and the expected hash value do not match, the subject technology sets a flag indicating that the block has failed verification. A counter tracking a number of verification failures is then incremented after setting the flag. The operating system is reset to perform verification of the root file system in a subsequent boot sequence.

Another aspect of the subject technology provides a non-zero threshold for verifying a root file system of an operating system stored on blocks of a boot storage. For each block of the blocks of the boot storage, the subject technology verifies a block of the boot storage. A counter tracking a number of verification failures is incremented if the block fails verification. The subject technology determines whether the counter meets a predetermined threshold. If the counter meets the predetermined threshold, the subject technology marks the root file system as corrupted. A recovery mode for the operating system is then initiated.

The subject technology further provides a system for verifying a root file system of an operating system stored on blocks of a boot storage. The system includes memory, one or more processors, and one or more modules stored in memory and configured for execution by the one or more processors. The system includes a cryptographic hash module configured to generate a hash value based on a predetermined cryptographic hash function for one or more blocks of a root file system on a boot storage. The system also includes a block verification module configured to verify the one or more blocks against corresponding expected hash values for the one or more blocks. Additionally, the system includes a recovery module configured to increment a counter for tracking a number of verification failures.

Yet another aspect of the subject technology provides, for each block of blocks of a boot storage, verifying a block of the boot storage. The subject technology increments a counter tracking a number of verification failures if the block fails verification. The subject technology determines whether the counter meets a predetermined threshold. If the counter meets the predetermined threshold, a root file system is marked as corrupted. A recovery mode for an operating system is then initiated. The subject technology then reverts to a second root file system of the operating system. If the counter does not meet the predetermined threshold, the subject technology resets the operating system to perform verification of the root file system in a subsequent boot sequence.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
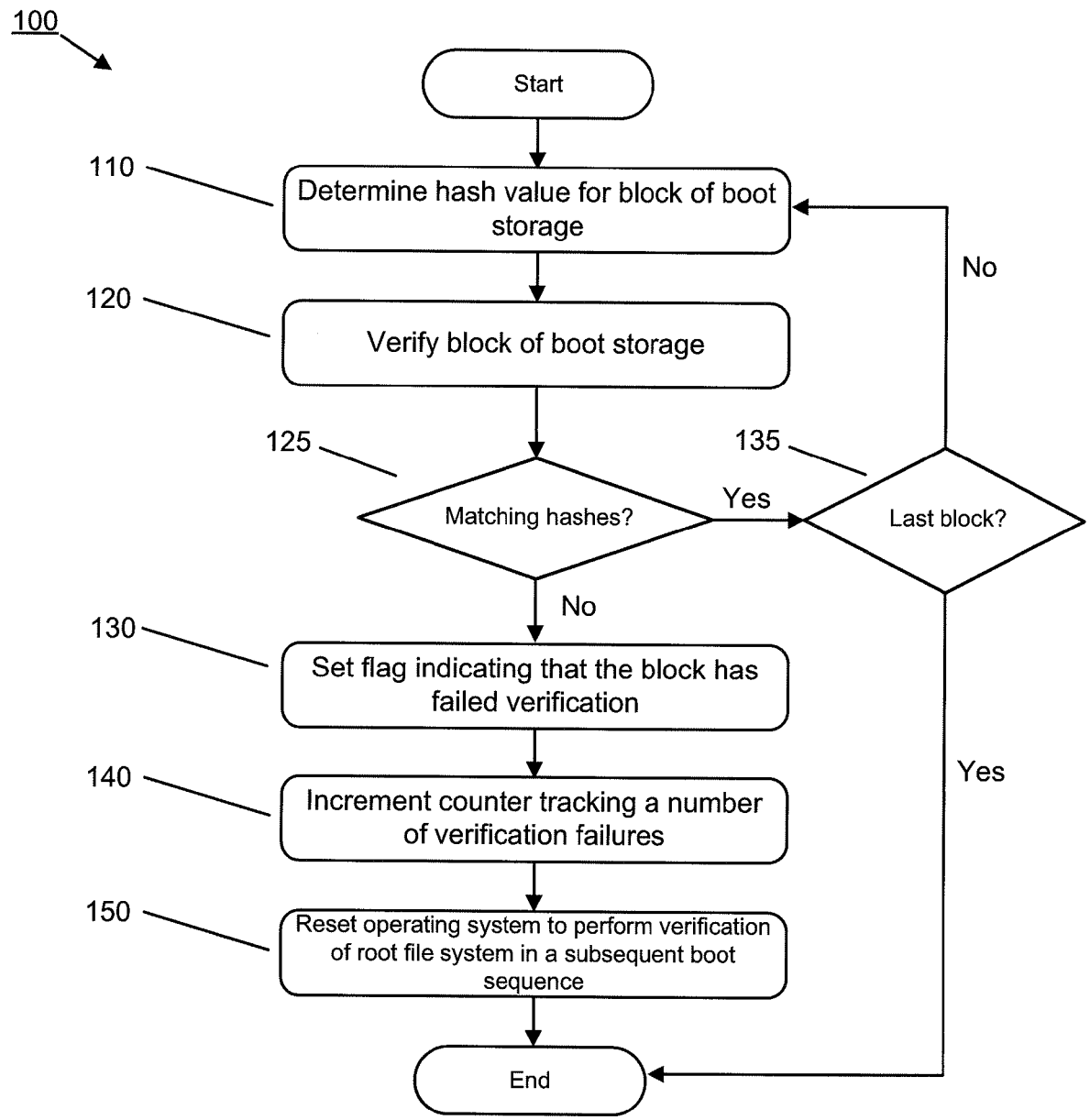
FIG. 1 conceptually illustrates an example process for verifying a root file system of an operating system stored on several blocks of a boot storage.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology provides verification of a root file system of an operating system by checking one or more blocks of the root file system on a boot storage. In one example, the operating system (OS) can provide a cryptographically verified boot path in which each stage of the boot sequence performs an integrity check of the next stage in the boot sequence. The verified boot path continues this verification all the way through the root file system. The root file system includes core components/files of the OS stored in different blocks of the boot storage that are verified to ensure their integrity during the boot sequence. In particular, the boot sequence can require a read operation(s) to one or more different blocks of the boot storage storing the root file system.

To expedite boot verification, the subject technology utilizes a block hash tree to verify one or more blocks of the root file system on demand instead of requiring that the entirety of the root file system be verified ahead of time before reading the block(s). The block hash tree has a given depth starting at 1 after the root node is ignored. Each node in the block hash tree is a cryptographic hash in which a leaf node includes a hash of some block data from the disk, and an intermediary node includes a hash of a number of child nodes from that intermediary node. Each level in the block hash tree includes one or more data structures respectively representing one or more entries in the tree. Each entry in the tree includes a collection of neighboring nodes that fit in a single page-sized block.

During the boot verification, hashes in the block hash tree are compared with expected hash values for the blocks (e.g., stored in a central collection of hashes) in order to verify the block integrity. In an instance in which a bad/invalid block is discovered (e.g., hash value mismatch), the root file system is flagged as being potentially corrupted and the running system is rebooted. Upon reboot, the root file system is then verified again upon detection that the flag is set.

In some cases, a transient error (e.g., from a firmware bug or power fluctuation) causes a block to fail verification. To better tolerate such transient errors, the subject technology utilizes a field (e.g., counter) to track a number of (verification) failures for the root file system. The subject technology then determines whether the failures exceed a programmatic threshold that represents an upper limit for the number of failures. If the threshold is met, then the root file system is marked bad/corrupted and a recovery mode is initiated.

In some configurations, the boot storage stores two mirror copies of the root file system. After marking the root file system as bad, the subject technology can then revert to the second root file system (e.g., by performing a system reset to boot into the second root file system). If the threshold is not met, the subject technology can reboot the system to verify the root file system again. In one example, a low-level background check of all blocks of the root file system is performed after reboot. In the event that verification is successful, the flag is reset and the boot sequence is successfully completed. If the root file system subsequently fails verification again, the field tracking the number of failures is incremented, and the running system is rebooted to perform the root file system verification again. Alternatively, if the number of failures meets the threshold after the subsequent verification failure, the root file system is then marked permanently bad, the recovery mode is initiated to revert to the second root file system, and the system is rebooted into the second file system.

FIG. 1 conceptually illustrates an example process 100 for verifying a root file system of an operating system stored on a several blocks of a boot storage. In particular, the process 100 verifies each block from different blocks of the root file system on the boot storage. A block as used herein can refer to a sequence of bytes or bits, having a nominal length (a block size) that are organized on the boot storage. The boot storage can include, but is not limited to, different types of machine readable media such as a solid state drive (SSD), flash memory, a hard disk, optical disc, etc.

The process 100 begins at 110 by determining a hash value for a block of the root file system to start verification of the root file system during a boot sequence for the operating system. The process 100 at 120 verifies the hash value for the block of the boot storage. In a verified boot sequence, the process 100 can verify the block of the root file system on the boot storage by comparing the determined hash value with an expected hash value of the block. At 125, the process 100 determines whether the determined hash value matches the expected hash value of the block. In one example, the expected hash value of the block can be determined based a cryptographic hash that is stored in a central collection of hashes for the root file system on the boot storage. For computing the hash value, a cryptographic hash function can be performed on the block to return a fixed-size bit string, which is the (cryptographic) hash value. The process 100 then compares the hash value with the expected hash value of the block.

If the hash values match, then the process 100 continues to 135 to determine whether the block was the last block of the root file system for verification in the boot storage. If the block was not the last block, the process 100 returns to 110 to repeat the operations for verifying the next block in the boot sequence. Alternatively, the process 100 ends if the last block was verified.

In one example, the determined hash value described above is stored in a hash tree in which different blocks of the root file system are stored as different leaf nodes of the hash tree, and each leaf node includes a hash value corresponding to the respective block of the root file system. The hash tree is stored in a separate partition of the boot storage in some configurations. In another example, the hash tree is appended to a root partition including the blocks of the root file system of the boot storage.

If the determined hash value and the expected hash value do not match at 125, the process 100 sets a flag indicating that the block has failed verification and therefore potentially corrupted at 130. In one example, the process 100 can set a flag by writing a bit into a predetermined storage area (e.g., protected or hidden partition) on the boot storage to indicate that the root file system is potentially corrupted. At 140, the process 100 increments a counter to indicate a number of verification failures after setting the flag. Similar to the setting the flag, the process 100 in one example can increment a bit counter at another predetermined storage area to indicate the number of verification failures during the boot storage verification process. The process 100 then resets the operating system at 150 to perform verification of the root file system in a subsequent boot sequence. The process 100 then ends.

Further, in some configurations after incrementing the counter at 140, the process 100 determines whether the counter meets a predetermined threshold. The predetermined threshold can be set to a predetermined value (e.g., 3). The process 100 marks the root file system as corrupted if the counter meets the predetermined threshold. The process 100 then initiates a recovery mode for the operating system and reverts to a second root file system of the operating system. The second root file system is a duplicate image of the root file system of the operating system in some configurations. The process 100 then resets the operating system to perform a boot sequence for the second root file system.

Although the above description of process 100 discloses that the counter is incremented at 140, the subject technology in some configurations can also decrement a counter that is initially set to a predetermined non-zero number representing a total number of times in which verification failures are tolerated. In this example, the process 100 instead decrements this counter. Once the counter reaches zero, the process 100 can proceed to mark the root file system as corrupted and perform a recovery procedure for the boot storage.

Figure 2:
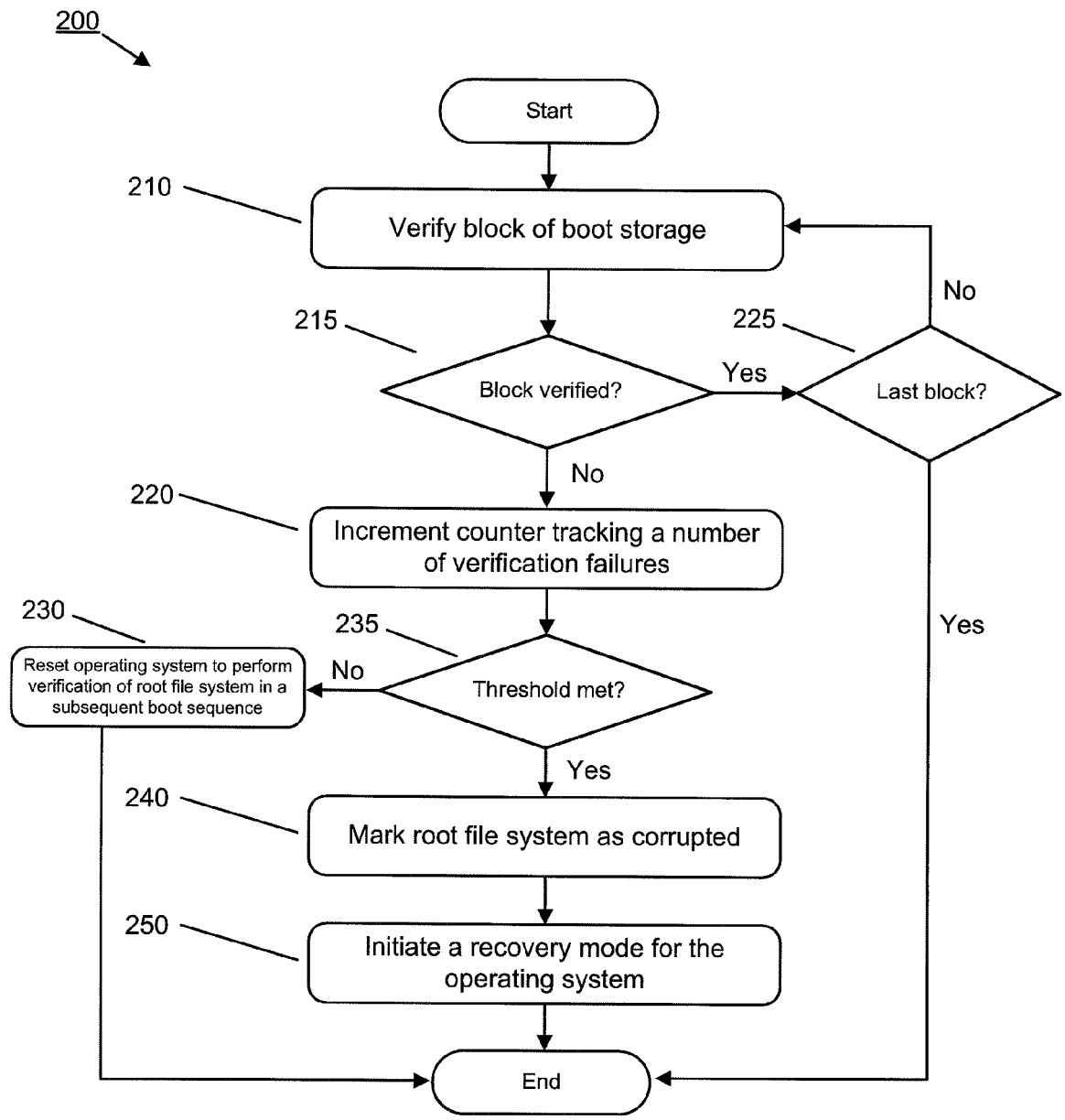
FIG. 2 conceptually illustrates an example process for providing a non-zero threshold for verifying a root file system of an operating system stored on several blocks of a boot storage.

FIG. 2 conceptually illustrates an example process 200 for providing a non-zero threshold for verifying a root file system of an operating system stored on several blocks of a boot storage. More specifically, the process 200 verifies each block from different blocks of the root file system on the boot storage to determine whether the non-zero threshold is met before marking the root file system as corrupted.

For each block of the root file system on the boot storage, the process 200 starts at 210 by verifying a block of the boot storage. At 215, the process 200 determines whether the block is verified. As described above in FIG. 1, some configurations of the subject technology can verify the block by comparing a computed hash value with an expected hash value for the block to determine whether the hash values match.

If the block is verified, the process 200 continues to 225 to determine whether the last block of the root file system on the boot storage has been verified. If the verified block was not the last block, the process 200 returns to 210 to repeat the operations for verifying the next block of the root file system in the boot sequence. Alternatively, the process 200 ends if the last block was verified.

If the block fails verification at 215, the process 200 at 220 increments a counter tracking a number of verification failures. In some configurations, the counter can be stored in a protected or hidden segment of the boot storage to prevent unauthorized tampering of the counter. In another example, the process 200 at 200 can decrement a counter if the counter is initially set to a non-zero number to represent a total number of verification failures tolerated by the system.

The process 200 at 235 determines whether the counter meets a predetermined threshold. The predetermined threshold is a non-zero number in some configurations. If the counter meets the predetermined threshold, the process 200 continues to 240 to mark the root file system as corrupted. In some configurations, the process 200 can mark the root file system by flipping a bit or setting a flag to indicate the root file system is corrupted or bad. The process 200 then continues to 250 to initiate a recovery mode for the operating system. In one example, the process 200 initiates the recovery mode by reverting to a second root file system of the operating system. The second root file system of some configurations is a mirror copy or image of the initial root file system of the operating system. The process 200 can then reset the operating system to perform a boot sequence for the second root file system. The process 200 then ends.

Alternatively, if the counter does not meet the predetermined threshold at 235, the process 200 resets the operating system at 230 and the process 200 performs another verification procedure for the blocks of the root file system during a subsequent boot sequence for the operating system. The process 200 then ends.

The following section describes an example computing environment including a system that can implement the above described processes as a computer program running on a particular machine, such as a computer or mobile device, or stored as instructions in a computer readable medium.

Figure 3:
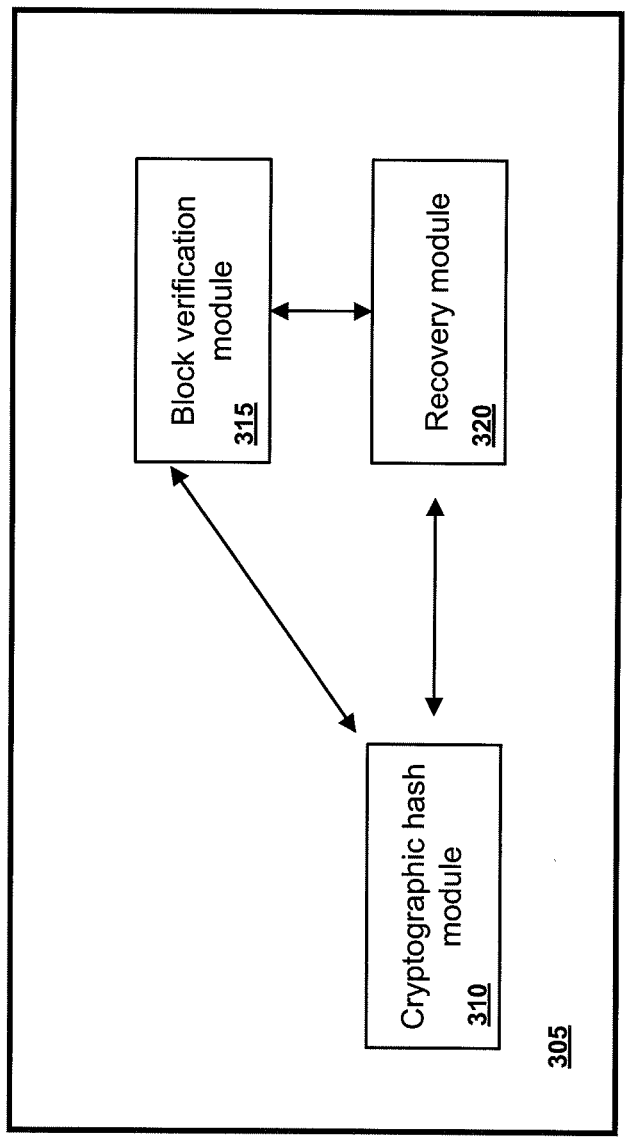
FIG. 3 conceptually illustrates an example computing environment.

FIG. 3 conceptually illustrates an example computing environment including a system for providing verifying a root file system of an operating system stored on a plurality of blocks of a boot storage. In particular, FIG. 3 shows a system 305 for implementing the above described processes FIGS. 1 and 2. In some configurations, the system 305 is part of an implementation running a particular machine. The system 305 can include a boot storage for storing the root file system for the operating system.

As shown in FIG. 3, the system 305 includes several modules for providing different functionality. The system 305 is configured to include a cryptographic hash module 310, a block verification module 315 and a recovery module 320. The cryptographic hash module 310 is configured to generate a hash value based on a predetermined cryptographic hash function for one or more blocks of a root file system on a boot storage. In some configurations, the cryptographic hash function is based on a cryptographic digest algorithm (e.g., MD5 Message-Digest Algorithm, etc.). The block verification module 315 configured to verify the one or more blocks against corresponding expected hash values for the one or more blocks. The expected hash values are stored in a separate partition on the boot storage in some configurations. Alternatively or conjunctively, an expected hash value for a block of the boot storage is stored linearly aligned to a nearest block of the block of the boot storage. The recovery module 320 is configured to increment a counter for tracking a number of verification failures. The recovery module 320 is further configured to set a flag indicating that the block has failed verification, and to reset an operating system to perform verification of the root file system in a subsequent boot sequence as described in the processes 100 and 200 of FIGS. 1 and 2, respectively.

As further shown in FIG. 3, each of the aforementioned modules can be configured to communicate between each other. For instance, different data, messages, API calls and returns can be passed between the different modules in the system 305.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which the processes described above in FIGS. 1 and 2 can be implemented.

Figure 4:
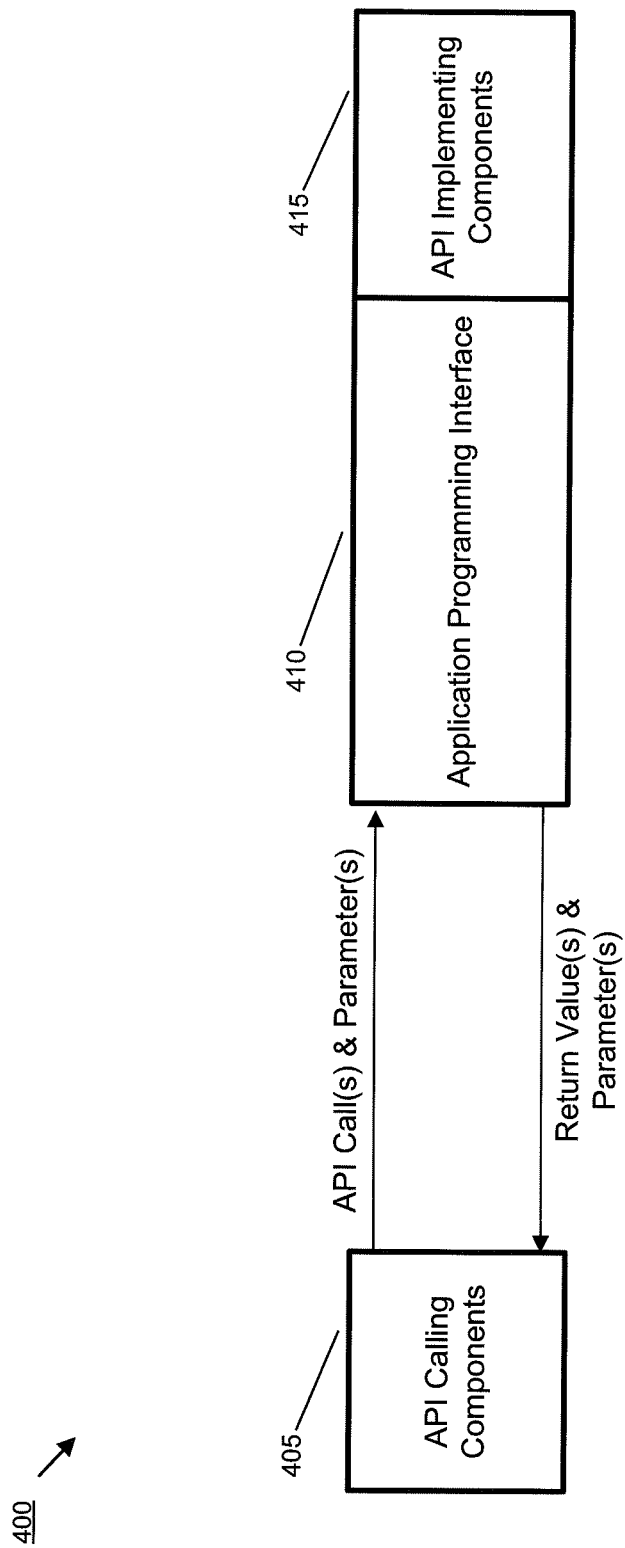
FIG. 4 conceptually illustrates an example application programming interface (API) architecture.

FIG. 4 is a block diagram illustrating an example API architecture, which can be used in some configurations of the subject technology. As shown in FIG. 4, the API architecture 400 includes the API implementing component 415 (e.g., an operating system, a library, a device driver, an API, an application program, software or other module) that implements the API 410. The API 410 specifies one or more functions, methods, classes, objects, protocols, data structures, formats and/or other features of the API-implementing component that can be used by the API-calling component 405. The API 410 can specify at least one calling convention that specifies how a function in the API implementing component receives parameters from the API calling component and how the function returns a result to the API calling component. The API calling component 405 (e.g., an operating system, a library, a device driver, an API, an application program, software or other module), makes API calls through the API 410 to access and use the features of the API implementing component 415 that are specified by the API 410. The API implementing component 415 can return a value through the API 410 to the API calling component 405 in response to an API call.

It will be appreciated that the API implementing component 415 can include additional functions, methods, classes, data structures, and/or other features that are not specified through the API 410 and are not available to the API calling component 405. It should be understood that the API calling component 405 can be on the same system as the API implementing component 415 or can be located remotely and accesses the API implementing component 415 using the API 410 over a network. While FIG. 4 illustrates a single API calling component 405 interacting with the API 410, it should be understood that other API calling components, which can be written in different languages (or the same language) than the API calling component 405, can use the API 410.

The API implementing component 415, the API 410, and the API calling component 405 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 5:
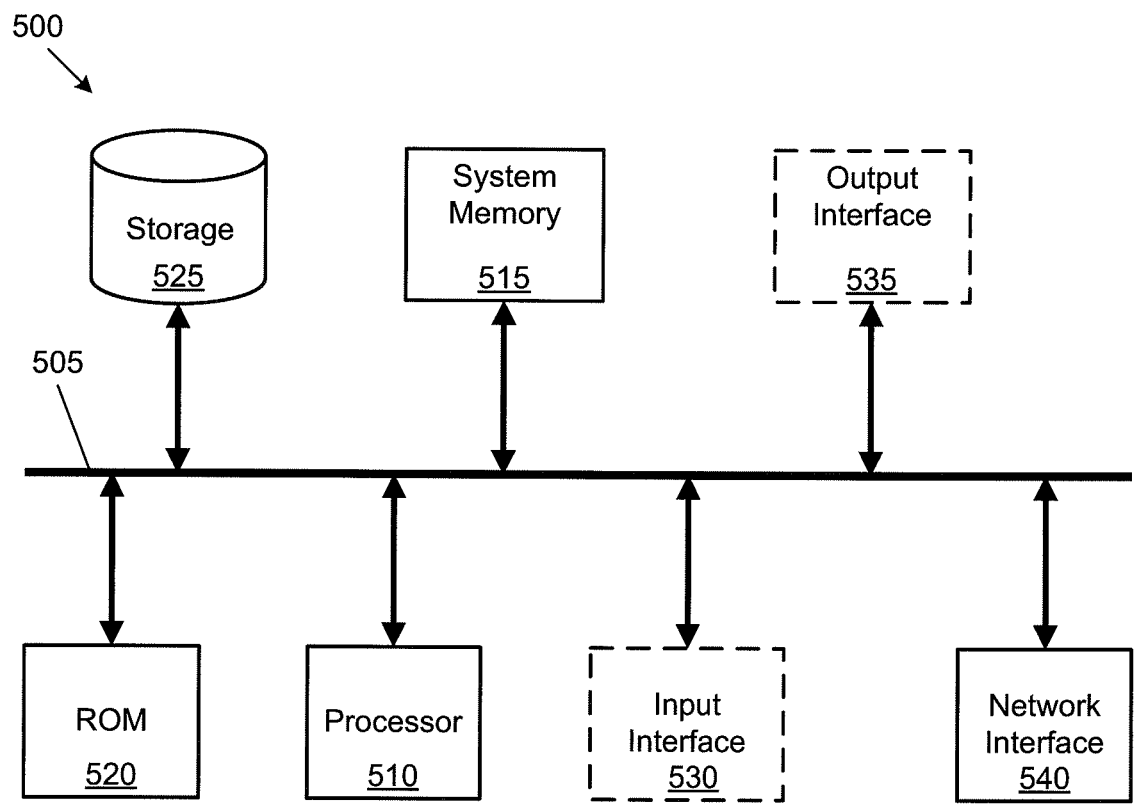
FIG. 5 conceptually illustrates a system with which some implementations of the subject technology may be implemented.

FIG. 5 conceptually illustrates a system 500 with which some implementations of the subject technology can be implemented. The system 500 can be a computer, phone, PDA, or any other sort of electronic device. Such a system includes various types of computer readable media and interfaces for various other types of computer readable media. The system 500 includes a bus 505, processing unit(s) 510, a system memory 515, a read-only memory 520, a storage device 525, an optional input interface 530, an optional output interface 535, and a network interface 540.

The bus 505 collectively represents all system, peripheral, and chipset buses that communicatively connect the numerous internal devices of the system 500. For instance, the bus 505 communicatively connects the processing unit(s) 510 with the read-only memory 520, the system memory 515, and the storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the system 500. The storage device 525, on the other hand, is a read-and-write memory device. This device is a non-volatile memory unit that stores instructions and data even when the system 500 is off. Some implementations of the subject technology use a mass-storage device (such as a magnetic or optical disk and its corresponding disk drive) as the storage device 525.

Other implementations use a removable storage device (such as a flash drive, a floppy disk, and its corresponding disk drive) as the storage device 525. Like the storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the subject technology's processes are stored in the system memory 515, the storage device 525, and/or the read-only memory 520. For example, the various memory units include instructions for processing multimedia items in accordance with some implementations. From these various memory units, the processing unit(s) 510 retrieves instructions to execute and data to process in order to execute the processes of some implementations.

The bus 505 also connects to the optional input and output interfaces 530 and 535. The optional input interface 530 enables the user to communicate information and select commands to the system. The optional input interface 530 can interface with alphanumeric keyboards and pointing devices (also called "cursor control devices"). The optional output interface 535 can provide display images generated by the system 500. The optional output interface 535 can interface with printers and display devices, such as cathode ray tubes (CRT) or liquid crystal displays (LCD). Some implementations can interface with devices such as a touchscreen that functions as both input and output devices.

Finally, as shown in FIG. 5, bus 505 also couples system 500 to a network interface 540 through a network adapter (not shown). In this manner, the computer can be a part of a network of computers (such as a local area network ("LAN"), a wide area network ("WAN"), or an Intranet, or an interconnected network of networks, such as the Internet. Any or all components of system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for verifying a root file system of an operating system stored on a plurality of blocks of a boot storage, the method comprising:
for each block of the plurality of blocks of the boot storage:
determining a hash value for the block of the boot storage;
verifying the block of the boot storage by comparing the determined hash value with an expected hash value of the block, wherein each block of the plurality of blocks has a respective expected hash value; and
if the determined hash value and the expected hash value do not match:
setting a flag indicating that the block has failed verification;
incrementing a counter tracking a number of verification failures after setting the flag; and
resetting the operating system to perform verification of the root file system in a subsequent boot sequence.

2. The method of claim 1, wherein the determined hash value is stored in a hash tree, different blocks of the root file system are stored as different leaf nodes of the hash tree, and each leaf node includes a hash value corresponding to the respective block of the root file system.

3. The method of claim 2, wherein the hash tree is stored in a separate partition of the boot storage.

4. The method of claim 2, wherein the hash tree is appended to a root partition including the plurality of blocks of the boot storage.

5. The method of claim 1, further comprising:
determining whether the counter meets a predetermined threshold; and
marking the root file system as corrupted if the counter meets the predetermined threshold.

6. The method of claim 5, wherein the predetermined threshold is a non-zero integer.

7. The method of claim 5, further comprising:
initiating a recovery mode for the operating system.

8. The method of claim 7, further comprising:
reverting to a second root file system of the operating system.

9. The method of claim 8, further comprising:
resetting the operating system to perform a boot sequence for the second root file system.

10. The method of claim 9, wherein the second root file system is a duplicate image of the root file system of the operating system.

11. A computer-implemented method for providing a non-zero threshold for verifying a root file system of an operating system stored on a plurality of blocks of a boot storage, the method comprising:
for each block of the plurality of blocks of the boot storage:
verifying a block of the boot storage based on an expected hash value of the block, wherein each block of the plurality of blocks has a respective expected hash value;
incrementing a counter tracking a number of verification failures if the block fails verification;
determining whether the counter meets a predetermined threshold;
if the counter meets the predetermined threshold:
marking the root file system as corrupted; and
initiating a recovery mode for the operating system.

12. The method of claim 11, wherein marking the root file system as corrupted comprises setting a flag indicating that the root file system is bad.

13. The method of claim 11, wherein the predetermined threshold is a non-zero number.

14. The method of claim 11, wherein initiating the recovery mode comprises reverting to a second root file system of the operating system.

15. The method of claim 14, further comprising:
resetting the operating system to perform a boot sequence for the second root file system.

16. A system for verifying a root file system of an operating system stored on a plurality of blocks of a boot storage, the system comprising:
memory;
one or more processors;
one or more modules stored in memory and configured for execution by the one or more processors, the modules comprising:
a cryptographic hash module configured to generate a hash value based on a predetermined cryptographic hash function for one or more blocks of a root file system on a boot storage;
a block verification module configured to verify the one or more blocks against corresponding expected hash values for the one or more blocks, wherein each block of the one or more blocks has a respective expected hash value; and
a recovery module, wherein, if the generated hash value and the corresponding expected hash value do not match for a block, the recovery module is configured to increment a counter for tracking a number of verification failures.

17. The system of claim 16, wherein, if the generated hash value and the corresponding expected hash value do not match for a block, the recovery module is further configured to set a flag indicating that the block has failed verification, and to reset an operating system to perform verification of the root file system in a subsequent boot sequence.

18. The system of claim 16, wherein the expected hash values are stored in a separate partition on the boot storage.

19. The system of claim 16, wherein an expected hash value for a block of the boot storage is stored linearly aligned to a nearest block of the block of the boot storage.

20. The system of claim 16, wherein the predetermined cryptographic hash function is based on a cryptographic digest algorithm.

21. A machine-readable medium comprising instructions stored therein, which when executed by a machine, cause the machine to perform operations comprising:
for each block of a plurality of blocks of a boot storage:
verifying a block of the boot storage based on an expected hash value of the block, wherein each block of the plurality of blocks has a respective expected hash value;
incrementing a counter tracking a number of verification failures if the block fails verification;
determining whether the counter meets a predetermined threshold;
if the counter meets the predetermined threshold:
marking a root file system as corrupted;
initiating a recovery mode for an operating system;
reverting to a second root file system of the operating system; and
if the counter does not meet the predetermined threshold:
resetting the operating system to perform verification of the root file system in a subsequent boot sequence.

* * * * *